UNITED STATES PATENT OFFICE.

HENRY KNIGHT, OF LIVERPOOL, ENGLAND.

IMPROVEMENT IN PROCESSES OF MAKING A PIGMENT BASE.

Specification forming part of Letters Patent No. 186,738, dated January 30, 1877; application filed November 27, 1876.

*To all whom it may concern:*

Be it known that I, HENRY KNIGHT, of Liverpool, in the county of Lancaster, in the Kingdom of England, manufacturing chemist, have invented a new and useful Improvement in Process of Making a Pigment Base, which improvement is fully set forth in the accompanying specification.

It consists as follows: To a strong solution of sulphate of zinc, obtained in any convenient manner, I add sufficient of a solution of polysulphide of calcium, in water, to precipitate nearly all the zinc. The result is a mixed precipitate of sulphate of lime and sulphide of zinc, which can be filtered out. I now add a sulphide of any alkali—such, for instance, as sulphide of soda—till no further precipitate falls. This precipitate I add to the former one. I now add to the mother-liquor a calcium salt (preferably chloride of calcium) till no further precipitate is formed. This precipitate I add to the others, intimately mix, dry, calcine at a dull-red heat, throw it (preferably in the heated state) into water, grind, lixiviate, and dry for market.

It is not necessary to use polysulphide of calcium; any soluble sulphide, especially those of the alkalies, will do as well; but the former is the cheapest, and the exact quantities for each kind of sulphide can be calculated from their atomic weights by any one conversant with chemistry. If sulphureted hydrogen be used the solution of sulphate of zinc must be as nearly saturated and heated as near boiling-point as possible. Sulphide of zinc alone is not so agreeable to work with as white lead. I find, however, that the addition of sulphate of lime improves it greatly, the two substances being a better pigment, combined in the way I have described, than either of them are separately. This effect of sulphate of lime is also shared to an equal extent by several salts of magnesia. While the greater portion of the zinc is thrown down on the addition of the calcic sulphide, enough remains in solution and passes off with the filtrate to make its recovery important in the economic preparation of this pigment.

By treating the filtrate with the sodic sulphide, as above described, the last traces of the zinc are precipitated—the superior alkalinity of the sodium over the calcium salt contributing effectively to this result.

The sodic sulphate which remains in solution after the reaction between the zinc sulphate and the sodic sulphide has taken place is valuable by reason of its contained sulphuric acid. This is made available by treating the solution with the calcic chloride, as indicated in the third step of preparation, the calcic-sulphate precipitate being added to the one already formed in the first stage of the process.

It will be noticed that by pursuing the manipulation as above described, the more valuable chemicals are entirely utilized, leaving as the mother-liquor, if due regard be had to the quantivalence of the combining agents, merely some common salt solution. The corresponding chlorides of potassium and ammonium will of course be formed if the sulphides of these bases be used instead of the sodic as precipitants of the zinc.

I am aware of the English Patent No. 13,092, issued in 1850 to G. F. De Douhet for an improvement in the disoxygenation of sulphates; and also of the United States Patent No. 157,864, issued to J. B. Orr, December 15, 1874, for the preparation of a pigment by treating barium sulphide with zinc chloride or nitrate, and I do not claim such; but

I claim as my invention—

The process of making a pigment base, which consists in adding to a solution of zinc sulphate a solution of calcic sulphide, to the filtrate a solution of sodic sulphide, and to the filtrate of this latter reaction a solution of calcic chloride, the several resulting precipitates being collected together, substantially in the manner and for the purpose set forth.

HENRY KNIGHT.

Witnesses:
WM. P. THOMPSON,
EDWARD C. COLTON.